US008280881B1

(12) United States Patent
Zhou et al.

(10) Patent No.: US 8,280,881 B1
(45) Date of Patent: Oct. 2, 2012

(54) SIMILAR SEARCH QUERIES AND IMAGES

(75) Inventors: Yun Zhou, Mountain View, CA (US);
Gaurav Garg, Palo Alto, CA (US);
Radhika Malpani, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 375 days.

(21) Appl. No.: 12/622,630

(22) Filed: Nov. 20, 2009

Related U.S. Application Data

(60) Provisional application No. 61/256,185, filed on Oct. 29, 2009.

(51) Int. Cl.
*G06F 17/30* (2006.01)
*G06F 7/00* (2006.01)

(52) U.S. Cl. ........................................... 707/728
(58) Field of Classification Search .................. 707/728
See application file for complete search history.

(56) References Cited

U.S. PATENT DOCUMENTS

| 2008/0301113 | A1* | 12/2008 | Chi et al. ........................... 707/5 |
| 2010/0030780 | A1* | 2/2010 | Eshghi et al. ..................... 707/6 |

OTHER PUBLICATIONS

Liu et al., Similarity Space Projection for Web Image Search and Annotation, MIR'05 ACM Nov. 10-11, 2005, pp. 49-56.*
Chakrabarti et al., "Contextual Advertising by Combining Relevance with Click Feedback," WWW 2008 / Refereed Track: Search—Ranking & Retrieval Enhancement Apr. 21-25, 2008, Beijing, China. pp. 417-426.

* cited by examiner

*Primary Examiner* — Kuen Lu
(74) *Attorney, Agent, or Firm* — Fish & Richardson P.C.

(57) ABSTRACT

Methods, systems and apparatus, including computer programs encoded on a computer storage medium, for determining similar queries for image searches. In one aspect, a method includes generating, for each of a plurality of search queries, a selection vector for the search query, each selection vector including a plurality of vector elements, each vector element corresponding to a unique image, and the value of each vector element being proportional to a number of selections of its corresponding unique image in response to the unique image being presented as a search result for the search query. The method further includes selecting a first search query and a second search query from the plurality of search queries and determining, from the selection vectors for the first and second search queries, a similarity measure that is a measurement of the similarity of the first search query to the second query.

20 Claims, 3 Drawing Sheets

SIMILAR SEARCH QUERIES AND IMAGES

CROSS-REFERENCE TO RELATED APPLICATIONS

This application claims the benefit under 35 U.S.C. §119(e) of U.S. Patent Application No. 61/256,185, titled "Similar Search Queries and Images," filed Oct. 29, 2009, which is incorporated here by reference.

BACKGROUND

The specification relates to digital information processing, and particularly to processing image search data.

The Internet provides access to a wide variety of resources, for example, video files, image files, audio files, or Web pages including content for particular subjects, book articles, or news articles. A search system can select one or more resources in response to receiving a search query. A search query is data that a user submits to a search engine to satisfy the user's informational needs. The search system selects and scores resources based on their relevance to the search query and on their importance relative to other resources to provide search results that link to the selected resources. The search results are typically ordered according to the scores.

A very popular search operation is image searching. A search engine can use search queries to find images. The search queries can be in the form of text, e.g., one or more terms or phrases, or images, e.g., an image file. For a search query that is text, the relevance of an image to the search query can be determined based on text associated with a resource (e.g., web page) in which the image is embedded. Text associated with the resource is compared to the search query to determine measures of relevance of the image relative to the search query. For example, an image of a coffee cup, stored in a file named "coffee cup.jpg", may be associated with a textual caption "coffee mug" that is rendered below the image, and also associated with the "coffee cup" text of the file name. For a search query that is an image, the relevance of an image to the search query can be determined based on image features values that are derived from the search query image and the image being evaluated.

The identification of similar queries can be used to facilitate one or more search operations. For example, the identification of similar queries can be used to provide query suggestions and/or to identify additional resources. Search queries, however, whether in the form of text or images, are often an incomplete expression of the information needed, and thus it is difficult to determine if two queries are similar based on their semantic content or image content. Additionally, processing requirements for search engines that store billions of queries in query logs can be very large. Finally, determining similarity of search queries is further complicated for search queries of different types, e.g., text in different languages, or a search query that is text and another search query that is an image.

SUMMARY

In general, one aspect of the subject matter described in this specification can be implemented in methods that include the actions of generating, for each of a plurality of search queries, a selection vector for the search query, each selection vector including a plurality of vector elements, each vector element corresponding to a unique image, and the value of each vector element being proportional to a number of selections of its corresponding unique image in response to the unique image being presented as a search result for the search query; selecting a first search query and a second search query from the plurality of search queries; and determining, from selection vectors for the first and second search queries, a similarity measure that is a measurement of the similarity of the first search query to the second search query. These and other embodiments of this aspect include corresponding systems, apparatus, and computer program products.

Another aspect of the subject matter described in this specification can be implemented in methods that include the actions of generating, for each of a plurality of images, a selection vector for the image, each selection vector including a plurality of vector elements, each vector element corresponding to a unique search query, and the value of each vector element being proportional to a number of selections of the image in response to the image being presented as a search result for the unique search query; selecting a first image and a second image from the plurality of images; and determining, from the selection vectors for the first and second images, a similarity measure that is a measurement of the similarity of the first image to the second image. These and other embodiments of this aspect include corresponding systems, apparatus, and computer program products.

Particular embodiments of the invention can be implemented to realize one or more of the following advantages. Search queries of different types can be readily compared for similarity processing, as the underlying selections of images determine the similarity of the search queries. A sparse matrix of search queries and image selection values can be processed in a manner that takes into account the features of the sparse matrix, thereby increasing efficiency relative to processing every element in the matrix. The processes that are used to identify similar queries from a data set (e.g., query logs and click logs) can be inverted to identify similar images from the same data set.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

§1.0 Example Environment

Figure 1:
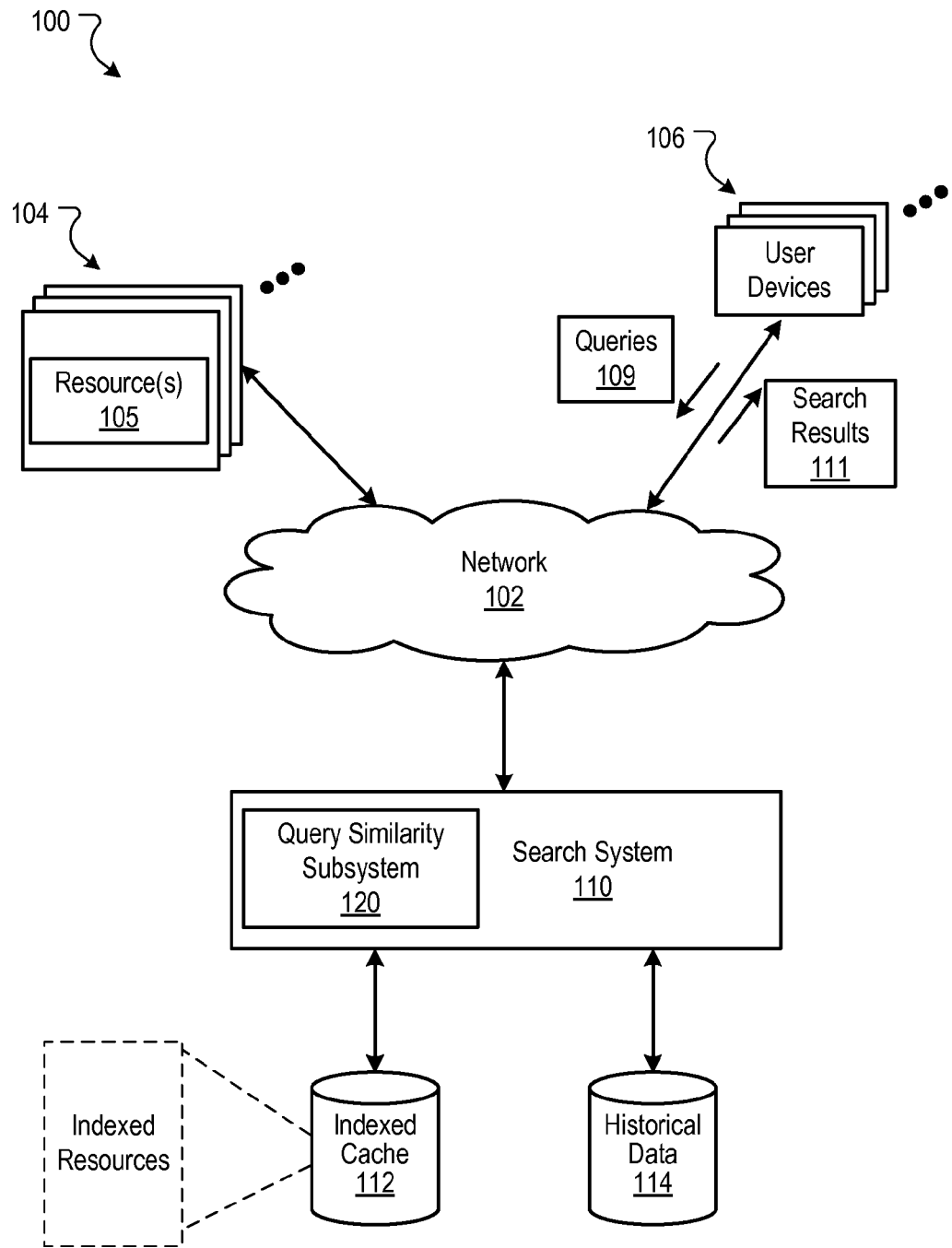
FIG. 1 is a block diagram of an example environment in which a search system provides search services.

FIG. 1 is a block diagram of an example environment 100 in which a search system 110 provides search services. The example environment 100 includes a network 102, e.g., a local area network (LAN), wide area network (WAN), the Internet, or a combination of them, connects web sites 104, user devices 106, and the search system 110. The environment 100 may include many thousands of web sites 104 and user devices 106.

A web site 104 is one or more resources 105 associated with a domain name and hosted by one or more servers. An example web site is a collection of Web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is any data that can be provided by a web site 104 over the network 102 and that is associated with a resource address. Resources 105 include HTML pages, word processing documents, and portable document format (PDF) documents, images, video, and feed sources, to name just a few. The resources 105 can include content, e.g., words, phrases, images and sounds and may include embedded information (e.g., meta information and hyperlinks) and/or embedded instructions (e.g., JavaScript scripts).

A user device 106 is an electronic device that is under control of a user and is capable of requesting and receiving resources 105 over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 105, the search system 110 identifies the resources 105 by crawling and indexing the resources 105 provided on web sites 104. Data about the resources 105 can be indexed based on the resource to which the data corresponds. The indexed and, optionally, cached copies of the resources 105 are stored in an indexed cache 112.

The user devices 106 submit search queries 109 to the search system 110. In response, the search system 110 accesses the indexed cache 112 to identify resources 105 that are relevant to the search query 109. The search system 110 identifies the resources 105 and generates search results 111 that identify the resources 105 and returns the search results 111 to the user devices 106. As used herein, a search result 111 is data generated by the search system 110 that identifies a resource 105 that is responsive to a particular search query, and includes a link to the resource 105. An example search result 111 can include a Web page title, a snippet of text or a portion of an image (or thumbnail of the image) extracted from the Web page, and the URL of the Web page.

For a search directed to text, the search results are ranked based on scores related to the resources 105 identified by the search results 111, such as information retrieval ("IR") scores, and optionally a quality score of each resource relative to other resources. In some implementations, the IR scores are computed from dot products of feature vectors corresponding to a search query 109 and a resource 105, and the ranking of the search results is based on relevance scores that are a combination of the IR scores and page quality scores. The search results 111 are ordered according to these relevance scores and provided to the user device 106 according to the order.

For a search directed to images and that uses a search query in the form of text, the search system 110 can combine the relevance score of a resource with a relevance feedback score of an image embedded in the resource. An example relevance feedback score is a score derived from a selection rate (e.g., click-through-rate) of an image when that image is referenced in a search result for a query. These combined scores are then used to present search results directed to the images embedded in the resources 105. The relevance scores for an image can be based on labels that are associated with the image. Labels are text or data flags that indicate a topic to which the image belongs. Labels can be explicitly associated with an image, for example, by the publisher that is providing the image. For example, a publisher can associate the text "football" with an image that includes content that is directed to football (e.g., an image of a football or a football player).

For a search directed to images and that uses a search query in the form of an input image, feature values derived from the input image are compared to feature values derived from the images that are being searched. In some implementations, the feature values are pre-computed during an off-line process, and prior to the time at which the search query is input. Image similarity scores for images are generated from the comparison of the feature values of the images to the feature values of the input image. In a manner similar to search queries in the form of text, the search system 110 can combine the similarity score of an image with the relevance feedback score of the image. These combined scores are then used to present search results directed to the images embedded in the resources 105.

The user devices 106 receive the search results 111, e.g., in the form of one or more web pages with each web page including multiple search results, and render the search results for presentation to users. In response to the user selecting a link in a search result at a user device 106, the user device 106 requests the resource 105 identified by the link. The web site 104 hosting the resource 105 receives the request for the resource from the user device 106 and provides the resource 105 to the requesting user device 106.

Data for the search queries 109 submitted during user sessions are stored in a data store, such as the historical data store 114. For example, for search queries that are in the form of text, the text of the query is stored in the historical data store 114. For search queries that are in the form of images, an index of the images is stored in the historical data store 114, or, optionally, the image is stored in the historical data store 114.

Selection data specifying actions taken in response to search results provided in response to each search query are also stored in the historical data store 114. These actions can include whether a search result was selected, and for each selection, for which query the search result was provided. The data stored in the historical data store 114 can be used to map search queries 109 submitted during search sessions to resources 105 that were identified in search results 111 and the actions taken by users. For example, the historical data can map how many times each image indexed in the indexed cache 112 was selected when presented in the form of a search result. As used herein, an image that is referenced in a search result is considered to be "selected" when the search result referencing the image is selected by a user.

§2.0 Search Query Similarity Processing

The search system 110 includes a query similarity subsystem 120 to determine similarity measures that measure the similarities between two search queries. Although described as a subsystem, the query similarity subsystem 120 can be implemented as an entirely separate system in data communication with the search system 110.

As described above, a search query can be in the form of text or in the form of an image. In some implementations, for search queries that include more than one text term, the query is processed as a whole and not as constituent parts. For example, the search queries "dolphins" and "dolphin habitats" and "habitats" each correspond to separate queries stored in the historical data store 114, e.g., Q0, Q1 and Q2, respectively.

As described below, the query similarity subsystem 120 can process the query and click data stored in the historical data store 114 to form a matrix in which each row corresponds to a unique query, and each column corresponds to a unique image. The intersection of each row and image corresponds to a value that is proportional to the number of times the image of the column was selected in response to the query corresponding to the row. In some implementations, the query similarity subsystem 120 generates a selection vector for each query. Each selection vector element corresponds to a unique image, and the value of each element is proportional to the number of clicks that its corresponding image received in response to the image being presented in a search result for the query.

In some implementations, the value of each element in a column is the number of clicks that a corresponding image has received for a query corresponding to the row intersecting the column. In other implementations, the value of each element in a column is the probability that a corresponding image will be selected for a query corresponding to the row intersecting the column.

The query similarity subsystem 120 can use the selection vectors to determine the similarity of any two queries. For example, the selection vectors of any two queries can be used to determine a cosine similarity measurement that measures the similarity of the two queries.

Figure 2:
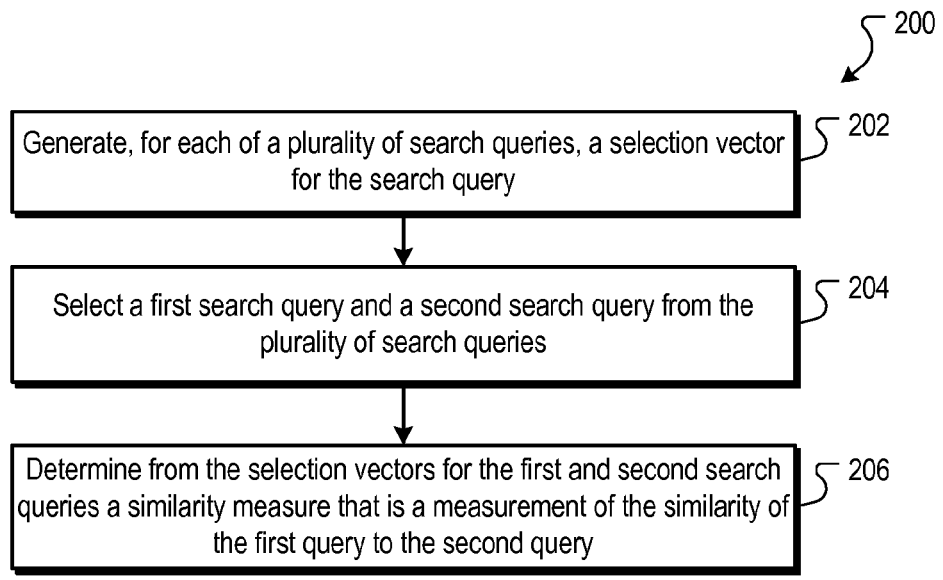
FIG. 2 is a flow chart of an example process for determining similarity measures between queries.

FIG. 2 is a flow chart of an example process 200 for determining similarity measures between queries. The example process 200 can be implemented in the query similarity subsystem 120 of FIG. 1.

The process 200 generates, for each of a plurality of search queries, a selection vector for the search query (202). The selection vectors can correspond to rows in a matrix, where each row corresponds to a unique query, and each column corresponds to a unique image. The value of each vector element is proportional to a number of selections of its corresponding unique image in response to the unique image being presented as a search result for the search query.

To illustrate, assume that historical data for three queries (Q0, Q1 and Q2) and four images (I0, I1, I2 and I3) stored in the historical data 114 is represented by the following selection matrix:

$$\begin{array}{c|cccc} & I0 & I1 & I2 & I3 \\ \hline Q0 & 1 & 2 & 3 & 0 \\ Q1 & 2 & 0 & 0 & 6 \\ Q2 & 2 & 0 & 5 & 1 \end{array}$$

For the query Q0, the selection vector is the elements in the row Q0. For example, the image I0 has been selected once; the image I1 has been selected twice; the image I2 has been selected three times; and the image I3 has never been selected; and so on for the queries Q1 and Q2.

The process 200 selects a first search query and a second search query from the plurality of search queries (204). For example, the process 200 can select the search queries Q0 and Q1.

The process 200 determines a similarity measure from the first and second selection vectors of the first and second search queries (206). The similarity measure is a measurement of the similarity the first query to the second query. In some implementations, the similarity measure is a symmetric similarity measurement. For example, a cosine similarity function is used to determine the similarity of the queries, according to the following equation:

$$sim(Q_i, Q_j) \equiv \frac{z_i \cdot z_j}{\|z_i\| \cdot \|z_j\|}$$

where the numerator is the inner product of the two selection vectors $z_i$ and $z_j$, and each vector $z_k$ is a vector of elements of the $k^{th}$ row. For the matrix above, the similarity measures for the queries are provide in Table 1 below:

TABLE 1

| Query Pair | Similarity Measure |
|---|---|
| Q0, Q1 | 0.085 |
| Q0, Q2 | 0.830 |
| Q1, Q2 | 0.289 |

In some implementations, any two queries are considered similar queries if the respective similarity measure for the queries exceeds a minimum similarity threshold. For example, a minimum similarity threshold of 0.5 can be used. Selection of the threshold can take into account a variety of factors, including how inclusive the designers desire the system to be when determining whether queries are similar or dissimilar.

§2.1 Increasing Efficiency In Similarity Processing

Although the example above only corresponds to three queries and four images, in practice the data corresponds to millions of queries and millions of images. The processing of such a large data set can be time consuming and requires many computer resources. Accordingly, in some implementations, one or more techniques to increase processing efficiency are used to minimize processing requirements.

A first example technique to increase processing efficiency limits the number of images considered for each query. For example, for any two queries in a pair of queries, up to M*2 elements are considered from their corresponding selection vectors z. For the first query in the pair, M elements corresponding to the M images that have the highest number of selections for the first query (or the highest probabilities of being selected) are selected; likewise, for the second query in the pair, M elements corresponding to the M images that have the highest number of selections for the second query are selected. If the two queries have no overlapping images in their respective sets of M elements (e.g., the queries "quark" and "football"), then M*2 elements are used to determine the similarity measure (which, due to the queries being orthogonal in vector space, will be zero). If the two queries have a large number of overlapping images in their respective sets of M elements, then the number of elements used to determine the similarity measure will, in the case of complete overlap, be M. The value of M can be selected by the designer. For example, a value between 100 and 2,000 can be selected. Other values can also be used.

In some implementations, if there are less than M elements that have been selected for a first query, i.e., there are only P non-zero values available from the selection vector z for a first query in a query pair, where P<M, then M−P images are randomly selected and the zero values corresponding to those images are used to populate the selection vector. In other implementation, M−P images are randomly selected from the M images of the second query in the query pair, and the zero values corresponding to those images are used to populate the selection vector. In still other implementations, only P elements are considered from the corresponding selection vectors z for the query pair, resulting in a maximum of P*2 elements.

Another technique to increase efficiency uses the characteristic of a sparse matrix that is defined by the selection vectors for all queries to increase processing efficiency of the similarity function. In practice, the selection vectors, each of which has a corresponding value for each indexed image, form a sparse matrix. Each selection vector forms a row in a matrix, and each column in the matrix corresponds to a particular image. For any particular query, e.g., a first query Q0, the similarity subsystem 120 selects first data only from first columns with non-zero values in the row of the selection vector for the first query Q0. To determine the similarity of the first query Q0 to a second query Q2, the similarity subsystem 120 selects, from the first data, second data from only the first columns with a non-zero value in the row of the selection query for the second query Q2. The second data are used to determine the cosine similarity.

Figure 3:
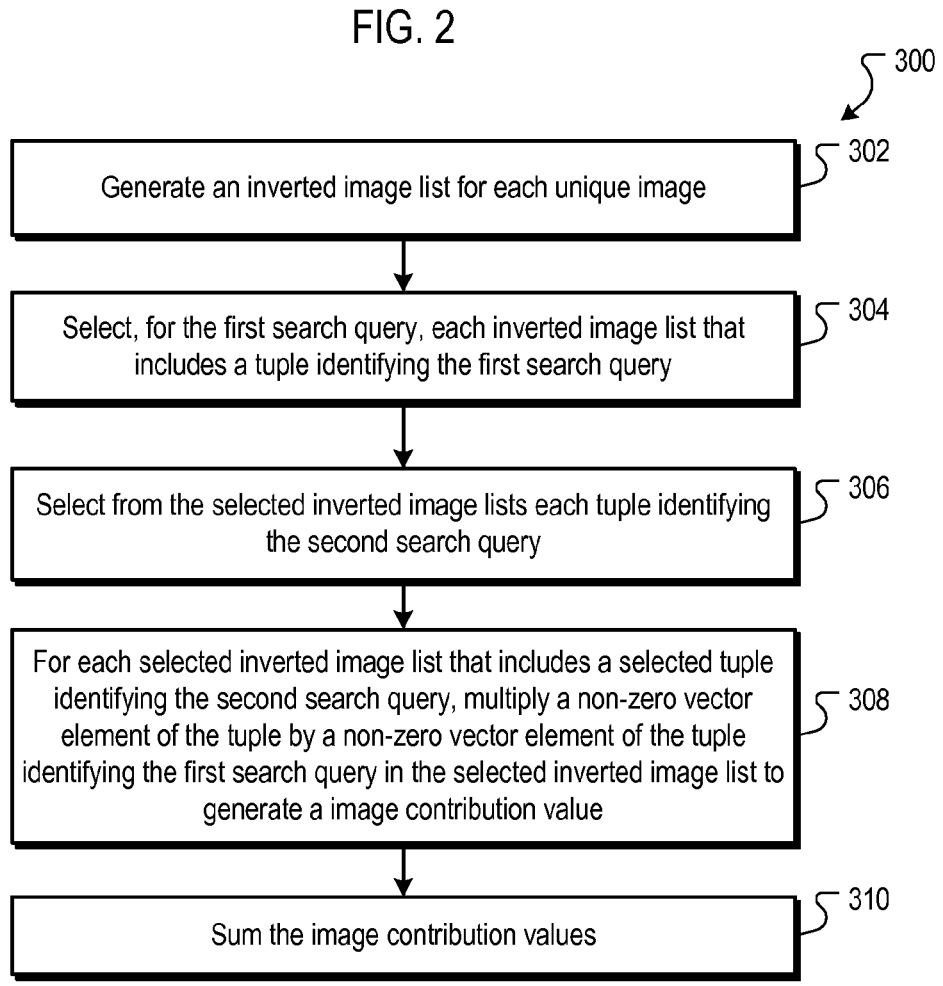
FIG. 3 is a flow chart of an example process for increasing the efficiency of determining similarity measures between queries.

This process is described in more detail with respect to FIG. 3, which is a flow chart of an example process 300 for increasing the efficiency of determining similarity measures between queries. The example process 300 can be implemented in the query similarity subsystem 120 of FIG. 1.

The process 300 generates an inverted image list for each of the unique images (302). For each unique image, the inverted image list has one or more tuples, and each tuple identifies a search query and includes a non-zero vector element corresponding to the unique image and the search query. For example, for the matrix above, the query similarity subsystem 120 generates the following inverted image lists:

I0: {Q0, 1}, {Q1, 2}, {Q2, 2}
I1: {Q0, 2}
I2: {Q0, 3}, {Q2, 5}
I3: {Q1, 6}, {Q2, 1}

Each tuple is of the form {<Search Query Identifier>, <Non-Zero Vector Element>}. As will be described below, each non-zero vector element may eventually contribute to a cosine similarity measure. Accordingly, in some implementations, each tuple includes a normalization value that is equal to the Euclidean norm of the selection vector of a query, an example of which is illustrated below:

I0: {Q0, 1, 1/norm(Q0)}, {Q1, 2, 2/norm(Q1)}, {Q2, 2, 2/norm(Q2)}
I1: {Q0, 2, 2/norm(Q0)}
I2: {Q0, 3, 3/norm(Q0)}, {Q2, 5, 5/norm(Q2)}
I3: {Q1, 6, 6/norm(Q1)}, {Q2, 1, 1/norm(Q2)}

Where norm(Q0) is the Euclidean norm of the selection vector <1, 2, 3, 0>; norm(Q1) is the Euclidean norm of the selection vector <2, 0, 0, 6>, and norm(Q2) is the Euclidean norm of the selection vector <2, 0, 5, 1>.

The process 300 selects, for a first search query, each inverted image list that includes a tuple identifying the first search query (304). For example, for the inverted image lists above, given a first query of Q0, the query similarity subsystem 120 will select the inverted image lists I0, I1 and I2. The inverted image list I3 is not selected, as the I3 image list does not include a tuple that identifies the first query Q0. Accordingly, the selected inverted image lists are:

I0: {Q0, 1, 1/norm(Q0)}, {Q1, 2, 2/norm(Q1)}, {Q2, 2, 2/norm(Q2)}
I1: {Q0, 2, 2/norm(Q0)}
I2: {Q0, 3, 3/norm(Q0)}, {Q2, 5, 5/norm(Q2)}

The process 300 selects, for a second search query, and from the selected inverted image lists that include the tuple identifying the first search query, each tuple identifying the second search query (306). For example, for the selected inverted image lists I0, I1 and I2 above, given a second query of Q2, the query similarity subsystem 120 will select the tuple {Q2, 2, 2/norm(Q2)} from the image list I0 and the tuple {Q2, 5, 5/norm(Q2)} from the image list I2.

The process 300, for each selected inverted image list that includes a selected tuple identifying the second search query, multiplies the non-zero vector element of selected the tuple by the non-zero vector element of the tuple identifying the first search query in the selected inverted image list to generate an image contribution value (308). For example, for the selected inverted image list above, and for the selected tuples, the query similarity subsystem 120 performs the following multiplications:

1 *2 (for tuples {Q0, 1, 1/norm(Q0)} and {Q2, 2, 2/norm(Q2)});
3*5 (for tuples {Q0, 3, 3/norm(Q0)}, {Q2, 5, 5/norm(Q2)})

The process 300 then sums the contribution values (310). For example, the query similarity subsystem 120 sums the values of 15 and 2. In some implementations, the query similarity subsystem 120 divides the sum of the image contribution values by a product of the normalization value of the tuples identifying the first search query and the normalization value of the tuples of the second search query. For example, in the example above, the value of 17 is divided by the product of norm(Q0) and norm(Q2). As a result, the similarity measure is equal to:

$$[(1*2)+(3*5)]/[norm(Q0)*norm(Q2)]$$

Which, in turn, is equal to the cosine similarity of sim(Q0, Q2).

Although the process 300 is described using lists and tuples as example data structures, other data structures and abstractions can also be used.

In some implementations, the first process to increase efficiency by limiting the number of images considered can be combined with the second process to increase efficiency by using the characteristics of a sparse matrix. For example, for any given query, only M image lists may be created. If more than M images have been selected for the given query, the M images with the highest numbers of selections (or selection rates) will be selected. The other queries from the selected M images lists define the queries to which the given query will be compared.

Additionally, the normalization values (norm(Qn)) for the any given query can be calculated from only the top M images selected for that query, and can be used for all tuples that identify the given query. For example, suppose M+N images have been selected for a query. The Euclidean norm is calculated from only the M images that have the highest number of selections for that query.

§2.2 Additional Similarity Measurements

In the example processes describe above, the value of each vector element is equal to the number of selections of its corresponding unique image in response to the unique image being presented as the search result for the search query. In other implementations, the vector elements can be other values, such as a probability that a corresponding unique image will be selected in response to the unique image being presented as a search result for the search query of the vector element, and the selection vector thus defines a probability distribution for the search query. The similarity of the queries can be measured by the Kullback Leibler Divergence (KL divergence) between the two distributions. The KL divergence can be determined for a divergence of a first query from a second query, and for a divergence of the second query from the first query. The measurements can be averaged so that the resulting measurement is symmetrical.

Figure 4:
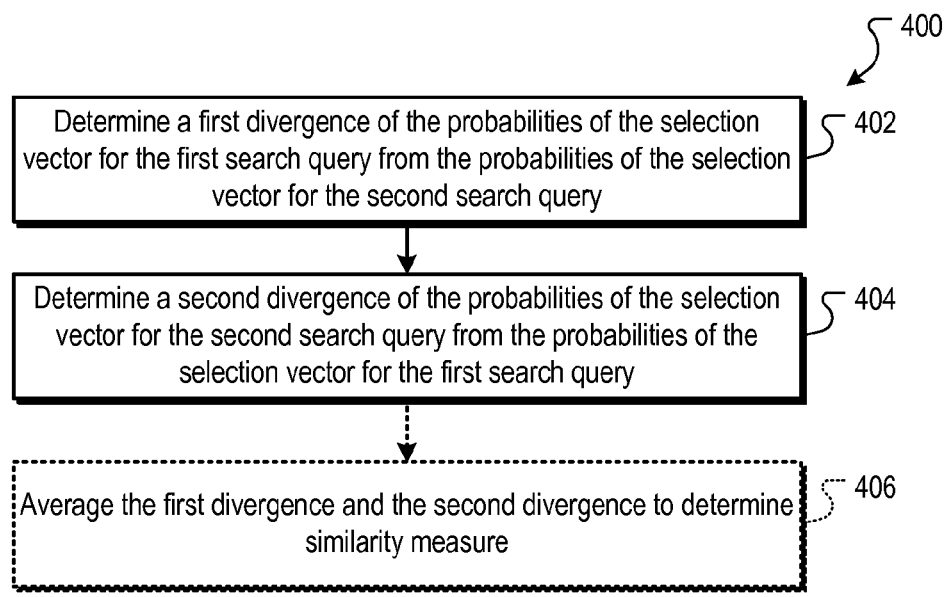
FIG. 4 is a flow chart of another example process determining similarity measures between queries.

FIG. 4 is a flow chart of another example process 400 determining similarity measures between queries. The process 400 can be used in the query similarity subsystem 120 of FIG. 1. The process 400 determines a divergence that measures the difference between the probabilities of the selection vector of the first search query, which defines a first distribution P, and the probabilities of the selection vector of the second search query, which defines a second distribution, Q. The divergence of Q from P is given as:

$$D(P \parallel Q) = \sum_i P(i) \log\left(\frac{P(i)}{Q(i)}\right)$$

Unlike cosine similarity, the divergence of Q from P and P from Q is not symmetrical, i.e., D(P∥Q) is not necessarily equal to D(Q∥P). Thus, in some implementations, separate similarity metrics are generated, a first similarity metric measuring the divergence of Q from P, and a second similarity metric measuring the divergence of P from Q.

The process 400 determines a first divergence of the probabilities of the similarity vector for the first search query from the probabilities of the similarity vector for the second search query (402). For example, the query similarity subsystem 120 can determine the divergence of Q from P.

The process 400 determines a second divergence of the probabilities of the selection vector for the second search query from the probabilities of the selection vector for the first search query (404). For example, the query similarity subsystem 120 can determine the divergence of P from Q.

In some implementations, instead of using two similarity metrics, the query similarity subsystem 120 can generate a symmetric similarity measurement. For example, the process 400 can average the first divergence and the second divergence to determine the similarity measure (406).

Other techniques can also be used to determine symmetric measurements from divergence measurements. For example, the lowest (or highest) of the first and second divergence values can be selected and used as a symmetric measurement.

§2.3 Evaluation of Similarity Measurements

Figure 5:
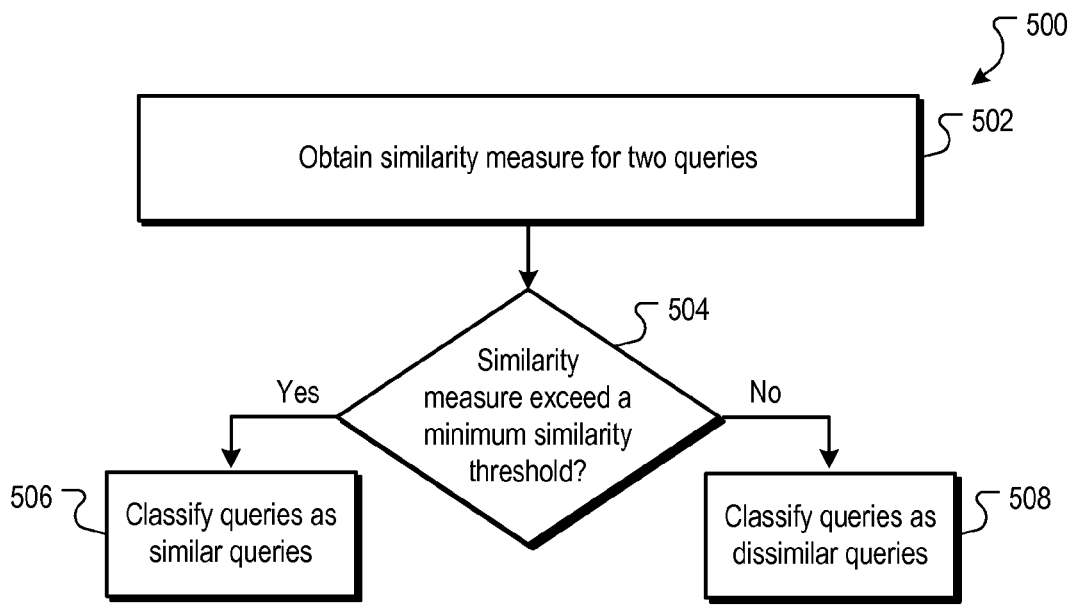
FIG. 5 is an example process for determining whether two queries are similar based on a similarity measure.

FIG. 5 is an example process 500 for determining whether two queries are similar based on a similarity measure. The process 500 can be used in the query similarity subsystem 120 of FIG. 1.

The process 500 obtains a similarity measurement for two queries (502). For example, the query similarity subsystem 120 of FIG. 1 can determine the similarity measure for two queries using any of the techniques described above, or can receive the similarity measure from another system.

The process 500 determines whether the similarity measure exceeds a minimum similarity threshold (504). For example, the query similarity subsystem 120 can compare the similarity measure to a threshold set by a system designer, or a threshold that is selected automatically, such as a threshold that results in a defined percentage of queries likely being determined to be similar, e.g., for any given query, at least 0.01% of all other queries will be determined to be similar.

If the similarity measure exceeds the threshold, the process 500 determines the two queries are similar (506). Conversely, if the similarity measure does not exceed the threshold, the process 500 determines the two queries are dissimilar (508). For example, the query similarity subsystem 120 can index queries so that they are related if the similarity measure of the queries exceeds the minimum similarity threshold.

Furthermore, in some implementations, for each search query, the query similarity subsystem 120 ranks the queries that are determined to be similar to the search query according to the similarity scores.

§2.4 Image Similarity Processing

While the processes described above facilitate the identification of similar queries for image searches, the same processes can be inverted and used to facilitate the identification of similar images. For example, the processes described above can use column vectors instead of row vectors for selection vectors, and these selection vectors are thus used to determine similar images. Each selection vector element in this alternate implementations corresponds to a unique query, and the value of each element is proportional to the number of clicks that its corresponding query received in response to the query being used to identify the image in a search result for the query. The value of each element can be the number of clicks that a corresponding query has received for an image corresponding to the row intersecting the column. In other implementations, the value of each element is the probability that the image will be selected when identified for a query corresponding to the row intersecting the column. In all other respects, the processes used to identify similar images is similar to those describe above, except that the processes are inverted to account for the image columns.

§3.0 Search Related Operations Using Similar Queries and/or Similar Images

The search system 110 can perform many additional search related operations using the data that the query similarity subsystem 120 provides. Example search related operations include query suggestion operations, search augmentation operations, and search result augmentation operations.

Query suggestion operations provide query suggestions to users. For example, for any given query input by a user, the search system 110 suggests similar queries to the user. The search system 110 can suggest the similar queries in an order determined by their similarity score rank. Additionally, as different types of queries can be readily compared for similarity—i.e., a search query in the form of text can be compared to a search query in the form of an image, and thus the suggested search queries need not be the of the same query type as the given query. For example, for a given query that is in the form of an image, suggested queries in both the form of text and images can be suggested.

Search augmentation operations are search operations performed automatically. For example, for any given query input by a user, the search system 110 can perform additional search operations using the top N most similar queries, where N can be any integer value of 1 or greater. In some implantations, the search system 110 only performs the additional search operations if the given query meets one or more criteria. For example, the additional search operations are not performed if the given query is a navigational query, and/or the additional search operations are performed only if the search results identified for the given query do not meet a minimum quality threshold, e.g., less than a minimum number of search results are identified, or the top-ranked search result does not meet a minimum relevance score. The search results that are provided in response to the search augmentation operation are provided with the search results responsive to the given query.

Search result augmentation operations are search operations that augment the search results, and do not involve performing an additional search. For example, for images that are determined to be similar using the inverted process described above, one or more similar images can be provided with a search result, e.g., next to a thumbnail of the search result image, one or more other similar images can be provided under the heading "more like this."

The above examples of the additional search related operations that the search system 110 can perform are not exhaustive, and additional search related operations can also be performed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method performed by a data processing apparatus, the method comprising:
    generating, for each of a plurality of search queries, a selection vector for the search query, each selection vector including a plurality of vector elements, each vector element corresponding to a unique image, and the value of each vector element being proportional to a number of selections of its corresponding unique image in response to the unique image being presented as a search result for the search query;
    selecting a first search query and a second search query from the plurality of search queries;
    generating an inverted image list for each of the unique images, the inverted image list including, for each unique image, one or more tuples, each tuple identifying a search query and including a non-zero vector element corresponding to the unique image and the search query;
    selecting, for the first search query, each inverted image list that includes a tuple identifying the first search query;
    selecting, for the second search query and from the selected inverted image lists that include the tuple identifying the first search query, each tuple identifying the second search query; and
    determining, from the selection vectors for the first and second search queries, a similarity measure that is a measurement of the similarity of the first search query to the second search query.

2. The computer-implemented method of claim 1, wherein determining the similarity measure comprises:
    for each selected inverted image list that includes a selected tuple identifying the second search query, multiplying the non-zero vector element of the tuple by the non-zero vector element of the tuple identifying the first search query in the selected inverted image list to generate an image contribution value; and
    summing the image contribution values.

3. The computer-implemented method of claim 2, wherein:
    each tuple includes a respective normalization value that is proportional to the values of the vector elements of the selection vector of the search query the tuple identifies; and
    determining the similarity measure further comprises dividing the sum of the image contribution values by a product of the normalization value of the tuples identifying the first search query and the normalization value of the tuples of the second search query.

4. The computer-implemented method of claim 3, wherein the value of each vector element is equal to the number of selections of its corresponding unique image in response to the unique image being presented as the search result for the search query.

5. The computer-implemented method of claim 3, wherein the value of each vector element is a probability that its corresponding unique image will be selected in response to the unique image being presented as a search result for the search query of the vector element.

6. The computer-implemented method of claim 3, wherein the normalization value is a Euclidean norm.

7. A computer-implemented method performed by a data processing apparatus, the method comprising:
    generating, for each of a plurality of search queries, a selection vector for the search query, each selection vector including a plurality of vector elements, each vector element corresponding to a unique image, and the value of each vector element being proportional to a number of selections of its corresponding unique image in response to the unique image being presented as a search result for the search query;
    selecting a first search query and a second search query from the plurality of search queries;
    generating an inverted image list for each of the unique images, the inverted image list including, for each unique image, one or more tuples, each tuple identifying a search query and including a normalized value that is proportional to a ratio of the non-zero vector element corresponding to the unique image and the search query to a normalization value that is proportional to the values of the vector elements of the selection vector of the search query the tuple identifies;
    selecting, for the first search query, each inverted image list that includes a tuple identifying the first search query;
    selecting, for the second search query and from the selected inverted image lists that include the tuple identifying the first search query, each tuple identifying the second search query; and
    determining, from the selection vectors for the first and second search queries, a similarity measure that is a measurement of the similarity of the first search query to the second search query.

8. The computer-implemented method of claim 7, wherein determining the similarity measure comprises:
    for each selected inverted image list that includes a selected tuple identifying the second search query, multiplying the normalized value of the tuple by the normalized value of the tuple identifying the first search query in the selected inverted image list to generate an image contribution value; and
    summing the image contribution values.

9. A system comprising:
    one or more computers; and
    a computer-readable medium coupled to the one or more computers having instructions stored thereon which, when executed by the one or more computers, cause the one or more computers to perform operations comprising:
        generating, for each of a plurality of search queries, a selection vector for the search query, each selection vector including a plurality of vector elements, each vector element corresponding to a unique image, and the value of each vector element being proportional to a number of selections of its corresponding unique image in response to the unique image being presented as a search result for the search query;
        selecting a first search query and a second search query from the plurality of search queries;
        generating an inverted image list for each of the unique images, the inverted image list including, for each unique image, one or more tuples, each tuple identifying a search query and including a non-zero vector element corresponding to the unique image and the search query;
        selecting, for the first search query, each inverted image list that includes a tuple identifying the first search query;
        selecting, for the second search query and from the selected inverted image lists that include the tuple identifying the first search query, each tuple identifying the second search query; and determining, from selection vectors for the first and second search queries, a similarity measure that is a measurement of the similarity of the first search query to the second search query.

10. The system of claim 9, wherein determining the similarity measure comprises:
for each selected inverted image list that includes a selected tuple identifying the second search query, multiplying the non-zero vector element of the tuple by the non-zero vector element of the tuple identifying the first search query in the selected inverted image list to generate an image contribution value; and
summing the image contribution values.

11. The system of claim 10, wherein:
each tuple includes a respective normalization value that is proportional to the values of the vector elements of the selection vector of the search query the tuple identifies; and
determining the similarity measure further comprises dividing the sum of the image contribution values by a product of the normalization value of the tuples identifying the first search query and the normalization value of the tuples of the second search query.

12. The system of claim 11, wherein the value of each vector element is equal to the number of selections of its corresponding unique image in response to the unique image being presented as the search result for the search query.

13. The system of claim 11, wherein the value of each vector element is a probability that its corresponding unique image will be selected in response to the unique image being presented as a search result for the search query of the vector element.

14. A computer-implemented method performed by a data processing apparatus, the method comprising:
generating, for each of a plurality of images, a selection vector for the image, each selection vector including a plurality of vector elements, each vector element corresponding to a unique search query, and the value of each vector element being proportional to a number of selections of the image in response to the image being presented as a search result for the unique search query;
selecting a first image and a second image from the plurality of images;
generating an inverted query list for each of the unique search queries, the inverted query list including, for each unique search query, one or more tuples, each tuple identifying an image and including a non-zero vector element corresponding to the image and the unique search query;
selecting, for the first image, each inverted query list that includes a tuple identifying the first image;
selecting, for the second image and from the selected inverted query lists that include the tuple identifying the first image, each tuple identifying the second image; and
determining, from the selection vectors for the first and second images, a similarity measure that is a measurement of the similarity of the first image to the second image;
wherein determining the similarity measure comprises:
for each selected inverted query list that includes a selected tuple identifying the second image, multiplying the non-zero vector element of the tuple by the non-zero vector element of the tuple identifying the first image in the selected inverted query list to generate a query contribution value; and
summing the query contribution values.

15. The computer-implemented method of claim 14, wherein:

each tuple includes a respective normalization value that is proportional to the values of the vector elements of the selection vector of the image the tuple identifies; and
determining the similarity measure further comprises dividing the sum of the query contribution values by a product of the normalization value of the tuples identifying the first image and the normalization value of the tuples of the second image.

16. A non-transitory computer-readable medium storing machine instructions operable to cause one or more programmable processors to perform operations comprising:
generating, for each of a plurality of search queries, a selection vector for the search query, each selection vector including a plurality of vector elements, each vector element corresponding to a unique image, and the value of each vector element being proportional to a number of selections of its corresponding unique image in response to the unique image being presented as a search result for the search query;
selecting a first search query and a second search query from the plurality of search queries;
generating an inverted image list for each of the unique images, the inverted image list including, for each unique image, one or more tuples, each tuple identifying a search query and including a non-zero vector element corresponding to the unique image and the search query;
selecting, for the first search query, each inverted image list that includes a tuple identifying the first search query;
selecting, for the second search query and from the selected inverted image lists that include the tuple identifying the first search query, each tuple identifying the second search query; and
determining, from the selection vectors for the first and second search queries, a similarity measure that is a measurement of the similarity of the first search query to the second search query.

17. The non-transitory computer-readable medium of claim 16, wherein determining the similarity measure comprises:
for each selected inverted image list that includes a selected tuple identifying the second search query, multiplying the non-zero vector element of the tuple by the non-zero vector element of the tuple identifying the first search query in the selected inverted image list to generate an image contribution value; and
summing the image contribution values.

18. The non-transitory computer-readable medium of claim 17, wherein:
each tuple includes a respective normalization value that is proportional to the values of the vector elements of the selection vector of the search query the tuple identifies; and
determining the similarity measure further comprises dividing the sum of the image contribution values by a product of the normalization value of the tuples identifying the first search query and the normalization value of the tuples of the second search query.

19. The non-transitory computer-readable medium of claim 18, wherein the value of each vector element is equal to the number of selections of its corresponding unique image in response to the unique image being presented as the search result for the search query.

20. The non-transitory computer-readable medium of claim 18, wherein the value of each vector element is a probability that its corresponding unique image will be selected in response to the unique image being presented as a search result for the search query of the vector element.

* * * * *